United States Patent [19]

Latsch et al.

[11] 4,394,855
[45] Jul. 26, 1983

[54] INTERNAL COMBUSTION ENGINE WITH EXTERNALLY SUPPLIED IGNITION HAVING AN IGNITION CHAMBER ASSOCIATED WITH THE MAIN COMBUSTION CHAMBER

[75] Inventors: Reinhard Latsch, Vaihingen; Ernst Linder, Mühlacker; Helmut Maurer, Horrheim; Klaus Müller, Tamm; Franz Rieger, Aalen-Wasseralfingen, all of Fed. Rep. of Germany

[73] Assignee: Robert Bosch GmbH, Stuttgart, Fed. Rep. of Germany

[21] Appl. No.: 261,413

[22] Filed: May 7, 1981

[30] Foreign Application Priority Data

May 10, 1980 [DE] Fed. Rep. of Germany ....... 3017948

[51] Int. Cl.³ ............................................. F02B 19/12
[52] U.S. Cl. ................................... 123/254; 123/260; 123/263; 123/293
[58] Field of Search ............... 123/254, 260, 263, 266, 123/268, 281, 286, 287, 293

[56] References Cited

U.S. PATENT DOCUMENTS

| 2,223,090 | 11/1940 | Boxan | 123/263 |
| 4,029,072 | 6/1977 | Goto et al. | 123/260 |
| 4,125,094 | 11/1978 | Noguchi et al. | 123/293 |
| 4,305,357 | 12/1981 | Scherenberg et al. | 123/254 |

4,332,224 6/1982 Latsch et al. ...................... 123/260

FOREIGN PATENT DOCUMENTS 1906585 8/1970 Fed. Rep. of Germany ...... 123/254

Primary Examiner—Charles J. Myhre
Assistant Examiner—Andrew M. Dolinar
Attorney, Agent, or Firm—Edwin E. Greigg

[57] ABSTRACT

An ignition chamber device is described which has an elongated, rotationally symmetrical form. The wall of the ignition chamber which protrudes into the main combustion chamber of the internal combustion engine has a coaxial overflow conduit embodied by a nozzle and radially extending discharge conduits which extend into the annular chamber which surrounds the nozzle. The ignition chamber is provided with an ignition device which has a central electrode that leads from the outside into the interior and by means of this central electrode the ignition voltage is carried via a conductor path, disposed in the wall, to a wall location opposite the nozzle, from where the ignition spark can leap the gap. A heat pipe is disposed in the nozzle and includes a portion arranged in close proximity to the cylinder wall, which prevents the ignition chamber from becoming overheated and on the other hand also enables the inflowing mixture to be heated up in optimal fashion on the way to the ignition location.

14 Claims, 2 Drawing Figures

INTERNAL COMBUSTION ENGINE WITH EXTERNALLY SUPPLIED IGNITION HAVING AN IGNITION CHAMBER ASSOCIATED WITH THE MAIN COMBUSTION CHAMBER

BACKGROUND OF THE INVENTION

The invention is based on an internal combustion engine with externally supplied ignition having an ignition chamber associated with the main combustion chamber. In the German Patent Application No. P 29 16 285.4, an ignition chamber is described which is embodied in this manner. However, local overheating can occur in this embodiment at the uncooled end wall which partitions off the ignition chamber from the main combustion chamber. As a result, the occurrence of glow ignitions at the hot surface cannot be precluded.

OBJECT AND SUMMARY OF THE INVENTION

The embodiment of the ignition chamber according to the invention has the advantage that overheating of the ignition chamber wall in the discharge area is prevented by the heat pipe which the invention provides. The embodiment of the nozzle further assures that the spin flow along the ignition chamber wall is disturbed very little by the central stream as it enters the ignition chamber via the first discharge conduit. It is thus possible for the fuel-air mixture entering via the second overflow conduits to be heated at the ignition chamber wall in an undisturbed manner, so as to bring about a calmed flow in the wall boundary layer. In an advantageous fashion, the mixture located in the annular conduit toward the end of the compression stroke is substantially free of remnant gas. In particular, the ignition location at the end of the nozzle is also free of remnant gas, which favors the flammability of the lean fuel-air mixture. The other parts of the ignition chamber wall are ceramic, which increases the durability of the ignition chamber under the influence of heat.

The invention will be better understood and further objects and advantages thereof will become more apparent from the ensuing detailed description of a preferred embodiment taken in conjunction with the drawings.

DESCRIPTION OF THE EXEMPLARY EMBODIMENT

Figure 1:
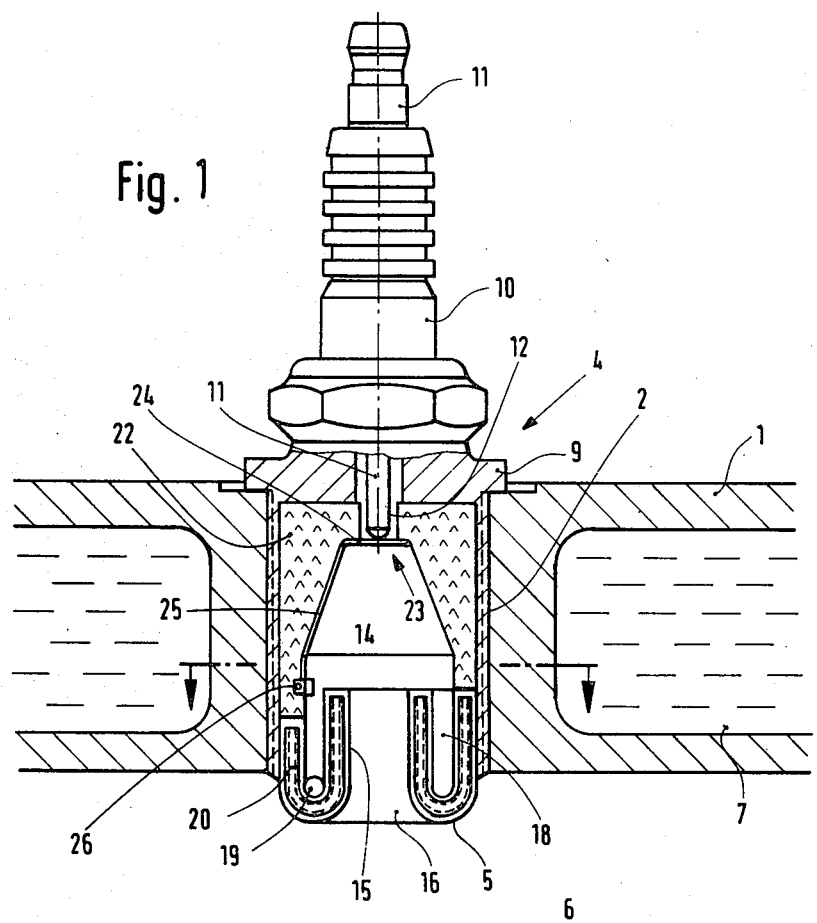
FIG. 1 shows the exemplary embodiment of the invention in longitudinal section.

FIG. 1 shows part of a combustion chamber wall 1 of an internal combustion engine which is not shown in further detail. A bore 2 having an inside thread is provided in the combustion chamber wall 1 and an ignition chamber insert 4 is inserted therein while the first boundary wall 5 on one end thereof protrudes into the combustion chamber 6 of the engine. The combustion chamber wall may be, for example, the wall of the cylinder head, and it may be provided with cooling chambers 7 filled with coolant fluid.

The ignition chamber insert 4 has a substantially cylindrical metal housing 9 which has the insertion thread for the threaded bore 2 on its outer jacket face. On the side opposite from the first boundary wall 5, the ignition chamber insert 4 has a socket for an insulator 10 the form of which is similar to that of a spark plug. A central, straight electrode 11 extends within the interior of the insulator 10. The electrode 11 has an external attachment means for connection to a source of electrical voltage, and at its other end it terminates via a bore 12 in the ignition chamber 14 disposed in the interior of the ignition chamber insert 4.

Figure 2:
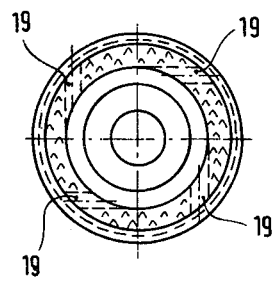
FIG. 2 shows the exemplary embodiment of FIG. 1 in cross section as indicated by arrows in FIG. 1.

The first boundary wall 5, which partitions off the ignition chamber 14 from the main combustion chamber, has a nozzle 15 disposed coaxially with the longitudinal axis of the ignition chamber insert 4. In its interior, this nozzle 15 forms a first central discharge conduit 16 and is arranged to protrude into the interior of the ignition chamber up to approximately the middle of the axial length of the chamber. An annular chamber 18 is thereby formed between the nozzle 15 and the ignition chamber wall. Second discharge conduits 19, which are tangential and are located substantially in a radial plane relative to the ignition chamber axis, discharge into this annular chamber 18, proximate to the outermost end thereof which is oriented toward the combustion chamber. The distribution of these conduits 19 may be best seen from FIG. 2, where these conduits are indicated by broken lines. A plurality of conduits 19 is advantageously provided, these being distributed about the circumference at equal angular distances from one another.

In the wall which forms the nozzle 15 and the first boundary wall 5, and in the wall which annularly surrounds the nozzle 15, there is a heat pipe 20 of known design. This heat pipe 20, insofar as it forms the outer wall of the ignition chamber, is immediately adjacent to the metal housing 9 of the ignition chamber device 4 and thereby is in heat-conducting contact with the cooling chambers 7. The other walls of the ignition chamber are embodied by a ceramic body 22, which is inserted into the metal housing 9, and which on the end 23 remote from the main combustion chamber has a central bore 12 intended as a passageway for the central electrode 11. The ignition chamber 14 has a substantially rotationally symmetrical form with respect to the longitudinal axis of the ignition chamber insert 4 and its diameter forms a frustum which extends in the direction of the end 23.

A yielding chip 24 of electrically conductive material which rests on the electrode 11 and closes off the bore 12 is disposed on this end 23 and is connected with a conductor path 25. The conductor path 25 is vapor coated onto the ceramic body 22 and leads along a jacket line to a point located radially opposite the outermost end of the nozzle 15. There, the conductor path 25 is connected with an electrode 26, and when voltage is applied to the electrodes an ignition spark is created between the electrode 26 and the nozzle 15. The conductive connection between the chip 24 and the electrode 11 may also be assured by means of soldering or welding.

The charge of fuel and air which is introduced into the main combustion chamber 6 during the intake stroke of the engine is forced into the ignition chamber 14 during the subsequent compression stroke via the first discharge conduit 16 and the second discharge conduits 19. The portion of the mixture entering via the first discharge conduit 16 thus flows directly into the rear portion of the ignition chamber, which forms a frustum, as shown. After the ignition chamber has been filled, the mixture flows back toward the portion of the ignition chamber which is located on the combustion chamber side. At the same time, the other portion of the mixture enters via the second discharge conduits 19 which extend tangentially into the ignition chamber 14. Accordingly, because of the course taken by these conduits 19, the mixture which is being introduced is set into rotary motion, so that a spin is created in the annular chamber 18 along the cylindrical wall of the ignition chamber 14. The nozzle 15 assures that this spin is not disturbed by that portion of the mixture which enters the chamber at the center. The realization of the ignition device also favors the formation of a non-turbulent flow, because here, in contrast to other forms of an ignition chamber embodiment, there are no electrodes protruding into the ignition chamber and no bores, intended to receive ignition devices such as spark plugs, penetrating the ignition chamber wall. As a result of the high rotary speed of the lean mixture quantities, there is an enrichment of the mixture with fuel in the vicinity of the wall. In addition, the enriched mixture at the ignition chamber wall is heated as a result of the long dwell time of the rotating mixture, which is provided with a low axial component. The ignitability of the mixture in the vicinity of the wall or in the wall boundary layer is further increased as a result. The closer the approach of the rotating mixture quantities to the ignition location at electrode 26, the more perceptible is the reverse-flow effect of the mixture introduced via the first overflow conduit 16, so that the result is a slowing down of the axial motion component. In the vicinity of the ignition spark, finally, the motion of the mixture quantities in solely rotary. Furthermore, the remnant gas which is still present in the ignition chamber is positively displaced away from the ignition location by the portion of the mixture entering via the second discharge conduits.

The heat pipe incorporated at one end of the device offers the excellent opportunity, while the ignition chamber is still cold, of preventing the conduction of heat to the cooled ignition chamber walls. In this area, the heat pipe functions as a heat insulator. On the other hand, when the ignition chamber has warmed up, the heat which builds up particularly in the vicinity of the first boundary wall 5 on one end is conducted away in a better fashion than in the case of simple conduction of heat by metals and by the cooled combustion chamber walls. It is accordingly possible to maintain an optimal maximum temperature without causing either the destruction of the surface or glow ignitions at the hot wall.

The embodiment of the ignition chamber wall as a ceramic body for the remaining portion of the ignition chamber increases its resistance to the effects of heat. In order to improve both heat removal and combustion, the ignition chamber narrows toward the rear side 23; as a result, a spin is transmitted to the charge introduced centrally through the bore 16, and better removal of heat is also effected.

In accordance with the embodiment described above, the ignition chamber is provided within an ignition chamber insert which is capable of being threadedly inserted into the combustion chamber wall. Naturally, it is also possible to secure the ignition chamber in other technically effective and equivalent ways. The embodiment according to the invention is furthermore not restricted to the necessity of providing an interchangeable ignition chamber insert. The conductor path 25 shown in FIG. 1 may furthermore be disposed inside a groove, rather than being vapor coated in place on the surface of the wall.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An internal combustion engine having a main combustion chamber with externally supplied ignition having an ignition chamber associated with said main combustion chamber, said ignition chamber arranged to communicate directly with said main combustion chamber via a discharge means and separated therefrom by a first wall in which said discharge means is formed and which partitions off said ignition chamber from said main combustion chamber, said discharge means including a first overflow conduit which is formed by a nozzle that protrudes into said ignition chamber and through which a fuel mixture is directed from said main combustion chamber to said ignition chamber, said discharge means further including at least one additional overflow conduit arranged to discharge a fuel mixture tangentially into an annular chamber formed between an outer circumference of said nozzle and a portion of said ignition chamber wall surrounding said nozzle, said ignition chamber having an ignition device including an electrode terminating radially across the annular chamber from the end of said nozzle which forms a radial spark gap with said nozzle directed toward said wall of said ignition chamber, a heat pipe disposed in a wall of said nozzle and at least in a portion of the ignition chamber wall adjoining cooled portions of the engine and surrounding said nozzle.

2. An ignition chamber device for insertion into a combustion chamber wall of an internal combustion engine having a main combustion chamber, said ignition chamber device having an ignition chamber capable of being connected with said main combustion chamber by means of a first wall which partitions off the ignition chamber from the main combustion chamber, a plurality of discharge conduits located in said first wall, said first wall forming a first discharge conduit embodied by a nozzle which protrudes into the interior of said ignition chamber, each of the remaining discharge conduits forming an additional overflow conduit which is directed substantially tangentially into an annular chamber formed between an outer circumference of said nozzle and a portion of the ignition chamber wall surrounding the nozzle, said ignition chamber having an ignition device including an electrode which terminates radially across the annual chamber from the end of said nozzle and forms a spark gap with said nozzle, a heat pipe disposed in the wall of said nozzle and at least in a portion of the ignition chamber wall adjoining cooled parts of the engine and surrounding the nozzle.

3. An internal combustion engine as defined by claim 1, characterized in that said electrode is insulated with respect to ground and a conductor forms a conductor path along said ignition chamber wall to a portion of said ignition chamber wall which is located opposite the end of said nozzle and thereat forms said spark gap relative to said nozzle.

4. An ignition chamber device as defined by claim 2, characterized in that said electrode is insulated with respect to ground and a conductor forms a conductor path along said ignition chamber wall to a portion of said ignition chamber wall which is located opposite the end of said nozzle and thereat forms said spark gap relative to said nozzle.

5. An internal combustion engine as defined by claim 3, characterized in that the ignition device has a central electrode insulated with respect to ground and further wherein said central electrode is provided with an external voltage connection arranged to terminate at the wall of said ignition chamber opposite from said first wall further wherein said central electrode is in contact with said conductor path insulated with respect to ground and further that said conductor path is embodied on its end as an ignition electrode.

6. An ignition chamber device as defined by claim 4, characterized in that the ignition device has a central electrode insulated with respect to ground and further wherein said central electrode is provided with an external voltage connection arranged to terminate at the wall of said ignition chamber opposite from said first wall further wherein said central electrode is in contact with said conductor path insulated with respect to ground and further that said conductor path is embodied on its end as an ignition electrode.

7. An internal combustion engine as defined by claim 5, characterized in that at least a portion of said ignition chamber wall adjoining the wall of the ignition chamber which is provided with said heat pipe is made of ceramic material.

8. An ignition chamber device as defined by claim 6, characterized in that at least a portion of said ignition chamber wall adjoining the wall of the ignition chamber which is provided with said heat pipe is made of ceramic material.

9. An internal combustion engine as defined by claim 7, characterized in that said conductor path is vapor coated onto the ceramic surface of said ignition chamber wall.

10. An ignition chamber device as defined by claim 8, characterized in that said conductor path is vapor coated onto the ceramic surface of said ignition chamber wall.

11. An internal combustion engine as defined by claim 7, characterized in that said conductor path is inserted in a groove of said ignition chamber wall.

12. An ignition chamber device as defined by claim 8, characterized in that said conductor path is inserted in a groove of said ignition chamber wall.

13. An internal combustion engine as defined by claim 9, characterized in that said contact between said central electrode and said conductor path is capable of being furnished by a yielding chip, which blocks entry of said central electrode into said ignition chamber.

14. An ignition chamber device as defined by claim 10, characterized in that said contact between said central electrode and said conductor path is capable of being furnished by a yielding chip, which blocks entry of said central electrode into said ignition chamber.

* * * * *